UNITED STATES PATENT OFFICE.

JOSEPH MOSES WARD KITCHEN, OF EAST ORANGE, NEW JERSEY.

METHOD OF DEHYDRATING MILK AND MILK COMPOSITIONS.

1,127,778.        Specification of Letters Patent.       Patented Feb. 9, 1915.

No Drawing.      Application filed January 24, 1914. Serial No. 814,188.

*To all whom it may concern:*

Be it known that I, JOSEPH MOSES WARD KITCHEN, a citizen of the United States, residing in the city of East Orange, county of Essex, State of New Jersey, have invented Improvements in Methods of Dehydrating Milk and Milk Compositions, of which the following is a specification.

The object of the present invention is to secure the dehydration of milk in a uniform manner, and with the least injury to its digestibility; and especially, to secure the dehydration of skim milk when used in compositions including other food materials, such as maize or other cereal meals, to which proteid constituents are desirable additions.

There is a very large amount of skim milk ineffectively utilized for human food, because of the large proportion of water in the skim milk, because of lack of stability in milk due to bacterial fermentations in it, and because of a lack of fatty constituents in it.

I aim to prepare a dry, easily handled food product for general use from skim milk; and particularly, from skim milk and cereals such as maize, producing a well balanced food nutritively that will be a very low cost food, and yet be hygenically, as well as in physical character, a desirable food composition.

If corn meal and a considerable amount of skim milk are admixed, and then dehydrated through the application of high heat, a hard horn-like mass is produced that is difficult to thoroughly dry, pulverize after drying, and which is somewhat difficult of digestion. To compound a ration of corn meal and skim milk that is nutritively well balanced, approximately three parts by weight of skim milk and one pound of corn meal should be used; and to completely dehydrate this mixture, and secure a desirable physical character in the composition, the skim milk should only be added gradually to the meal and dehydrated at a moderate heat, so that the meal granules are not dissolved and diffused in the milk. I find that a desirable method to adopt in carrying out this principle, is to continually but slightly moisten the meal with the milk, and to dry at low temperatures most of the milk on the external surfaces of the meal by the aid of a substantially immediate, continuous and extended contact with the milk of fresh volumes of drying air in such manner that a dried layer of milk of greater or less thickness is formed on the outside of the meal granules. This is preferable to allowing the milk to become much absorbed into the meal granules. Such a composition is of desirable physical character and digestibility: in use, it producing a more light and porous food-mass capable of more immediate and quick penetration by the digestive juices. This procedure can be successfully performed in various ways; and dried food compositions having various proportions of milk may be produced. Milk by itself can be dried into granular form in this manner.

As an example of carrying out the process, may be cited the method of repeatedly sifting granules of repeatedly moistened meal through a heated atmosphere, using an elevating device for continually raising to a high level, the meal being treated; and employing other devices for separating and spacing the moistened granules as they are precipitated through the heated atmosphere. The drying heated air rising in vertical counter-current to the falling granules, imparts its highest heat to the granules at the lowest level, and gradually and progressively looses its heat to the falling granules at progressively higher levels. Another plan is to have a steam jacketed trough for holding the meal. The trough is provided with a revolving set of lifting paddles peripherally attached to a shaft, the revolution of which continually lifts the moistened meal in such manner as to secure its precipitation back into the steam heated trough; the precipitated granules passing through and losing moisture to the air heated by the heated contents of the trough. The milk is gradually but continually being added to the meal in moderate amounts; and by mechanical admixture, is distributed throughout the meal-mass, slightly moistening the surfaces of the meal granules in a substantially continuous manner, while the drying process is continually being carried on through diffusion into the atmosphere of the warmed watery constituents of the milk. I especially avoid very high temperatures in this performance by avoiding the heating of the material being treated, to over 150° F. A drying of the material is easily secured by moderate heat, in a somewhat slow manner, but with a desirable result as to the character of the product. It will be observed that this performance is substantially a continual one of moistening, aerating and drying the milk.

I do not confine myself to any special method of dehydration of milk. It will be obvious that a granular product of dried milk may be produced in this manner by starting the process with fine sized nuclei of meal, dry sugar, or other substance.

It is obvious that the method herein described can be applied to the drying of other nutrient fluids besides milk; and that nutrient fluid on which the milk or other nutrient fluids can be dried by my process, may include a variety of such materials; and that the dehydration of such fluids or compositions, can be effected without the resulting damage to digestive character that may follow the high heating of a food substance. The same objection of applying high heat in dehydrating milk, also more or less applies to the dehydration of other animal, and vegetable fluids containing protein and other constituents. But the process pertains in particular to skim milk, because of the immense amounts of that material that are either wasted, or inadequately utilized for human food.

Subject matter is herein disclosed which is not herein claimed, but which is claimed in both of two copending applications of applicant, viz: that which especially relates to compositions of skim milk and maize, and other cereals rich in vegetable fats. in Sr. No. 740,963, filed January 9, 1914; and that which particularly relates to milk and cocoa compositions, in Sr. No. 872,877, filed Nov. 18, 1914.

What I claim as new is:

1. The method herein described, which consists in, slowly moistening a cereal granule with milk while mechanically stirring the milk and cereal granules and continually drying the milk on the granules by exposure to dry volumes of air until a desired amount of milk is dried on the granules.

2. The method herein described, which consists in, gradually, slowly but continually moistening with milk a granular-nutrient, continually admixing by stirring, aerating and drying the moistened granules at a moderate temperature, of about 150° F., and finally withholding the milk and completely drying the granular nutrient.

3. The method herein described, which consists in, coating granules with milk without saturating the granules, continually drying the milk on the granules and forming thereon a coat of dried milk in progressively increasing thickness, continually adding more milk to the dried coating and drying it on the dried coating of milk, said granules and their coatings being finally completely dried.

4. The method herein described, which consists in, adding to a cereal rich in vegetable fat, skim milk in desired definite proportions suited to the composing of a desirably balanced ration, such addition being gradually performed, and such admixed material being dried by continual aeration with drying air.

5. The method herein described, which consists in, gradually admixing skim milk with and continually drying the skim milk on the granules of a comminuted cereal in an atmosphere of a temperature, below 200° F., the milk being admixed with, the granules and being continually dried upon the surface of the granules of the comminuted cereals progressively as the milk is added to and admixed with the granules.

6. As a new food product, a dry, combined composition of dehydrated skim milk and pulverized cereal granules, said skim milk having been dehydrated by continually applying the milk to and drying the milk in a progressively thickening coat to said granules during the process of evaporation of the moisture of the milk from the surfaces of the granules at a temperature sufficiently low to prevent the dissolving of the granules, little or none of the milk having been absorbed into the substance of the interior of the granules.

7. As a new food product, maize granules coated with dried skim milk, said granules having a form substantially such as they had before the milk coating was applied.

8. As a new food product, a granule of comminuted cereal having a coating composed of successively applied films of fluid milk dried onto said granule.

9. As a new food product, a composition of cereal granules coated with dried skim milk, said coating being composed of successively applied and dried coats of skim milk.

10. As a new food product, a granule of nutrient material having a coating comprised of successively applied films of milk dried thereon.

11. As a new food product, a dried nutrient granule, said granule being composed of a nutrient nucleus and successively applied and dried coats of a nutrient fluid composed of at least a considerable amount of protein constituent, said drying having been effected at a temperature below the boiling point of water and the digestive character of said dried coats having been conserved by said temperature in said drying.

JOSEPH MOSES WARD KITCHEN.

Witnesses:
 GEO. L. WHEELOCK,
 FLORENCE JACKSON.